United States Patent
Haefner et al.

(10) Patent No.: US 8,747,507 B2
(45) Date of Patent: Jun. 10, 2014

(54) FILTER ELEMENT WITH GUIDE SHAFT

(75) Inventors: Uwe Haefner, Weinheim (DE); Markus Koegel, Roemerberg (DE); Roland Dobner, Wald-Michelbach (DE); Andreas Breuer, Birkenau (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 13/529,447

(22) Filed: Jun. 21, 2012

(65) Prior Publication Data

US 2012/0324851 A1 Dec. 27, 2012

(30) Foreign Application Priority Data

Jun. 21, 2011 (DE) .......................... 10 2011 118 680
Mar. 16, 2012 (DE) .......................... 10 2012 005 188

(51) Int. Cl.
*B01D 39/00* (2006.01)
*B01D 46/00* (2006.01)
*B01D 47/00* (2006.01)
*B01D 53/00* (2006.01)

(52) U.S. Cl.
USPC ................... 55/521; 55/494; 55/495; 55/497; 55/501

(58) Field of Classification Search
USPC .................... 55/521, 494–497, 501
See application file for complete search history.

(56) References Cited

U.S. PATENT DOCUMENTS

| | | | | |
|---|---|---|---|---|
| 2,423,741 | A * | 7/1947 | Vokes et al. ...................... | 55/491 |
| 3,183,286 | A * | 5/1965 | Harms .......................... | 264/46.4 |
| 3,933,452 | A * | 1/1976 | Rudin .............................. | 55/499 |
| 5,100,496 | A * | 3/1992 | Mitchell ....................... | 156/446 |
| 5,509,950 | A * | 4/1996 | van de Graaf et al. .......... | 55/486 |
| 5,809,800 | A * | 9/1998 | Deal .............................. | 62/507 |
| 6,387,143 | B1 * | 5/2002 | Adiletta .......................... | 55/497 |
| 6,454,826 | B2 * | 9/2002 | Fath et al. ....................... | 55/490 |
| 6,852,217 | B2 | 2/2005 | Jokschas et al. | |
| 7,901,476 | B2 * | 3/2011 | Kao .............................. | 55/379 |
| 2005/0050869 | A1 * | 3/2005 | Haes .............................. | 55/497 |
| 2007/0119132 | A1 * | 5/2007 | Ikeno et al. ..................... | 55/492 |
| 2008/0236121 | A1 * | 10/2008 | Volkmer et al. ................. | 55/497 |
| 2009/0298413 | A1 * | 12/2009 | Arold ........................... | 454/158 |

FOREIGN PATENT DOCUMENTS

| | | |
|---|---|---|
| DE | 100 29 539 | 12/2001 |
| DE | 10 2004 025 274 | 12/2004 |
| DE | 10 2005 048 841 | 7/2007 |
| DE | 20 2009 000 969 | 8/2010 |
| EP | 0 754 483 | 1/1997 |
| EP | 2 127 724 | 12/2009 |
| WO | 00/00721 | 1/2000 |

* cited by examiner

*Primary Examiner* — Amber Orlando
(74) *Attorney, Agent, or Firm* — Grossman, Tucker, Perreault & Pfleger, PLLC

(57) ABSTRACT

A Filter element for insertion into a housing of a ventilation unit or air conditioner, comprising a bellows with folds and a front side, which can face a wall of the housing, wherein the folds on the front side define fold cross-sectional surfaces, wherein to the front side at least one guiding slot is assigned and wherein a fold cross-sectional surface has a geometry in the area of a guiding slot that is different from the fold cross-sectional surface of a multiplicity of folds, is, in view of the task of providing an efficient filter element which, after problem-free manufacture is equipped with guiding slots into which guide pins can be inserted, characterized in that a multiplicity of regular fold walls is provided, wherein each two flanking walls flank the guiding slot.

9 Claims, 7 Drawing Sheets

FILTER ELEMENT WITH GUIDE SHAFT

CROSS REFERENCE TO RELATED APPLICATIONS

This application claims priority to German Patent Application No. 10 2011 118 680.1 filed on Jun. 21, 2011 and German Patent Application No. 10 2012 005 188.3 filed on Mar. 16, 2012, the disclosures of which are incorporated by reference herein in their entirety.

FIELD OF THE INVENTION

The invention relates to a filter element for insertion into a housing of a ventilation unit or air conditioner, comprising a bellows with folds and a front side, which can face a wall of the housing, wherein the folds on the front side define fold cross-sectional surfaces, wherein to the front side at least one guiding slot is assigned and wherein a fold cross-sectional surface has a geometry in the area of a guiding slot that is different from the fold cross-sectional surface of a multiplicity of folds, wherein a multiplicity of regular fold walls is provided, wherein each two flanking walls flank the guiding slot.

BACKGROUND

From DE 10 2005 048 841 B3 a filter element is known that is placed in the housing of a ventilation unit of a motor vehicle. Specifically, with this filter arrangement, guide pins of the housing correspond to guiding slots in the filter element.

By this means a mechanical coding is to be implemented that ensures that only a filter element suited for the housing is placed into this housing.

The guiding slots are oriented parallel to the fold backs or to the pleating direction of the folds of a folded bellows. In addition, the guiding slots are oriented parallel to the fold walls.

The bellows is hemmed by an edge strip into which passages have been inserted. The guide pins are run through the passages and then extend parallel to the fold walls or the fold backs.

A passage must be chosen to be somewhat larger than the maximum diameter of a guide pin, so that it can be guided with no problems through the passage.

Therefore, when passages are manufactured by stamping, for example, relatively large tools are needed, which are guided between the fold walls. These tools can damage the bellows.

SUMMARY

Therefore the task of the invention is to provide an efficient filter element which is equipped, after manufacture without problems, with guiding slots into which guide pins can be inserted.

According to the invention, it is recognized that a bellows with regularly configured folds must have an irregular configuration in certain locations, to be able to insert guide pins without problems into the filter element. Specifically recognized is that some folds can be deformed and/or provided with larger dimensions or intervals, so that stamping tools can be inserted without problems between the fold walls.

The stamping tools can be used to stamp in sufficiently large passages for the guide pins in an edge strip. Since according to the invention, some fold cross-sectional surfaces have a geometry differing from the regular fold cross-sectional surfaces, the stamping tools can be placed between the fold walls so that they are not damaged. To that extent the invention-specific configuration of the filter element leads to considerable advantages in production of the filter element.

It has further been recognized that the modification advantageously impairs only a few folds in the area of a guide slot, and outside this area, it comes close to not impairing the fold geometry. The fold geometry outside the area of a guide slot can thus be adapted to the particular technical filter requirements. It is conceivable to adapt to pressure losses, to the degree of fraction deposition for certain particles, or to adsorption performances.

The modification described previously of some folds by deformation, alterations in dimensions or intervals, is determined by the geometry of the guide pins. Lastly, it has been recognized that selective modification of fold cross-sectional surfaces permits a technical filter optimization as well as problem-free manufacture of guiding slots.

A multiplicity of regular fold walls is provided, with each two flanking fold walls flanking the guiding slot. This specific configuration ensures that a bellows can be regularly pleated over large areas and only needs to be modified at selected locations. At the selected locations every two flanking fold walls are modified so that they differ from the remaining fold walls. The flanking fold walls are stamped out or shaped so that a stamping tool can be inserted with no problems between the fold walls.

Therefore an efficient filter element results, which after problem-free manufacture is provided with guide slots into which guide pins can be inserted.

Consequently, the problem mentioned initially is solved.

The guiding slot can lie predominantly or completely within the fold cross-sectional surface with another geometry. By this means, a guide pin can be admitted so that the designed height of a filter element can be kept relatively low.

With this as a background, the flanking fold walls could be deformed. Through a deformation, a fold cross-sectional surface in the area of a guide slot can be adjusted so that a tool can be inserted without problems between the fold walls. The deformation can be effected for example by deep-drawing or by thermal treatment.

In the area of a guiding slot, at least one support element could be assigned to the bellows cross-sectional area in the vicinity of a guiding slot. Deformation can also be induced by insertion of support elements. Support elements can especially be used which stabilize a certain fold geometry. One support element can be assigned to a flanking fold wall, or a support element can be assigned to two flanking fold walls. A support element can be configured to be clamp-shaped.

The flanking fold walls could each have two sections angled toward each other. With this specific embodiment, at least one bending location is assigned to a fold wall. Through the bending locations, fold walls are provided with bulges which create room for a stamping tool.

The flanking fold walls could be configured to be arch-shaped. One arch shape can be formed in especially problem-free fashion with a tubelike instrument into the bellows. With this as the background it is conceivable that the tubelike instrument is heated so that the bellows is thermally deep-drawn.

The flanking fold walls could form a rectangular fold cross-sectional surface. A rectangular fold cross-sectional surface can be inserted with especial ease into the bellows by means of a cuboid-shaped instrument.

The flanking fold walls could be inclined at a larger angle to each other than the regular fold walls. By this specific embodiment, between the flanking fold walls, areas are created in which they are placed at a farther interval from each other than the regularly spaced fold walls are.

With this as the background, the flanking fold walls could manifest greater fold-wall height than the regular fold walls. Due to this specific embodiment, a bellows can be created with a unitary field height, but with individual areas in which two flanking fold walls are at a more obtuse angle to each other than the regular fold walls.

The geometry of the fold cross-sectional surface in the area of a guiding slot could also be adjusted by a fanning-out of the bellows. Due to an at least partial bending or distortion of the bellows, the flanking fold walls can suitably be spaced from each other. Thus a bellows can be adapted in cost-effective fashion to the geometric conditions that are preset by the guide pins. The fanned state of the bellows can be secured by the edge strips and/or the side strips.

A filter element with a fan-shaped progression in the area of the passages or stampings can have only a front-side edge strip with a passage or a stamping.

By stampings or passages made in asymmetric fashion, the structure can be made to be secure against torsion. The filter element can be situated in only one position in the housing. A Poka-Yoke system can be created.

DETAILED DESCRIPTION

Figure 1:
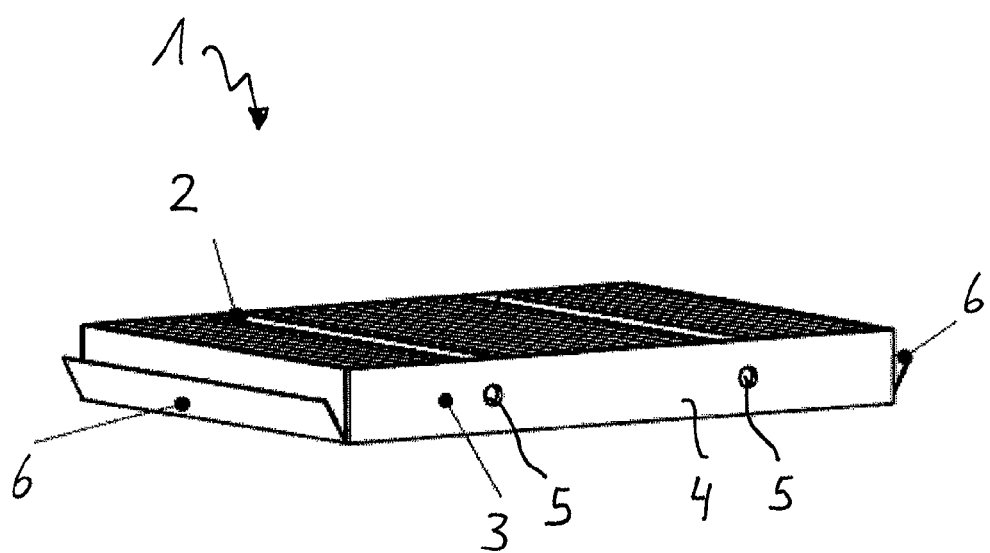
FIG. 1 is a perspective view of a filter element with an edge strip in which passages are made for guide pins.

FIG. 1 shows a cuboid-shaped filter element 1 for insertion in a housing of a ventilation unit or air conditioner, in a perspective view.

Filter element 1 comprises a bellows 2 with folds and a front side 3 which can be turned toward one wall of a housing. The front side 3 is hemmed by an edge strip 4, in which passages 5 for guide pins are inserted.

In addition, filter element 1 has side strips 6, from which V-shaped securing brackets project. Bellows 2 is manufactured from a fleece material. The edge strip 4 is also manufactured from a fleece material. The side strips 6 along with the V-shaped projecting securing brackets are likewise manufactured from a fleece material.

Figure 2:
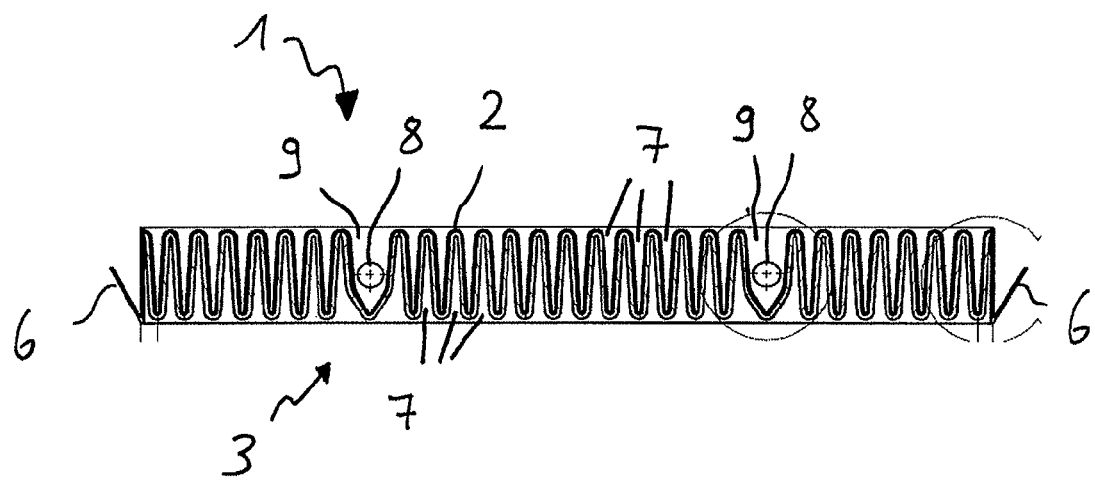
FIG. 2 is a sectioned view of the filter element according to FIG. 1, depicting that every two flanking fold walls are provided with a bend location.

FIG. 2 shows the cuboid-shaped filter element 1 as per FIG. 1 in a sectional view.

FIG. 2 shows a filter element 1 for insertion into a housing of a ventilating system or air conditioner, comprising a bellows 2 with folds and a front side 3 which can face a wall of the housing, wherein the folds on front side 3 define fold cross-sectional surfaces and wherein at least one guiding slot 8 is assigned to front side 3. A fold cross-sectional surface 9 in the area of a guiding slot 8 has a geometry different from the fold cross-sectional surface 7 of a multiplicity of folds. This is depicted in an enlarged view in FIG. 3.

Figure 3:
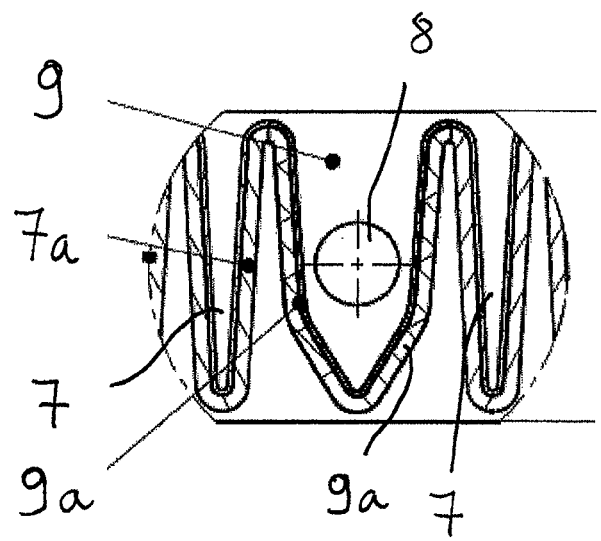
FIG. 3 is an enlarged depiction of an irregular fold cross-sectional surface of the filter element according to FIG. 1 and FIG. 2.

FIG. 3 shows that in the area of guiding slot 8, the fold cross-sectional surface 9 has a geometry different from the adjoining fold cross-sectional surfaces 7 of a multiplicity of folds.

A multiplicity of regular fold walls 7a is provided, wherein every two flanking fold walls 9a flank the guiding slot 8. FIG. 3 shows that the flanking fold walls 9a have two sections that are angled toward each other. Therefore each of the fold walls 9a has a bending location. The irregular fold cross-sectional surface 9 in the area of the guiding slot 8 therefore has a considerably larger surface than the regular fold cross-sectional surfaces 7 of the multiplicity of folds.

Figure 4:
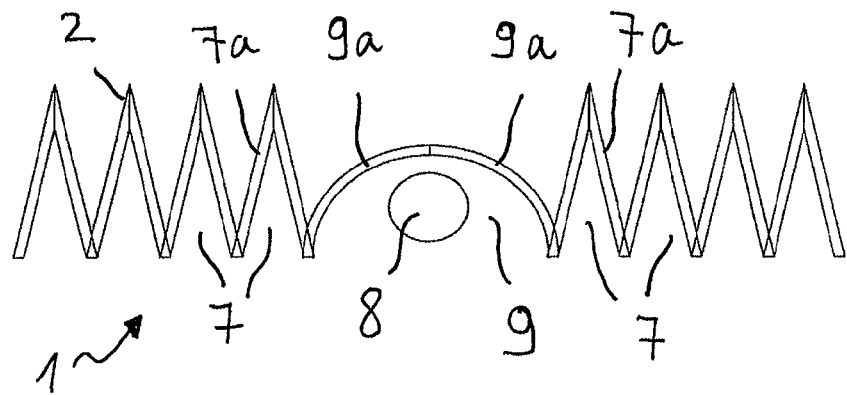
FIG. 4 is an irregular fold cross-sectional surface of an additional filter element, in which two flanking fold walls are configured to be arch-shaped.

FIG. 4 shows a sectional view of an additional filter element 1, in which the flanking fold walls 9a are deformed. The flanking fold walls 9a are configured as arches. They flank guiding slot 8.

Figure 5:
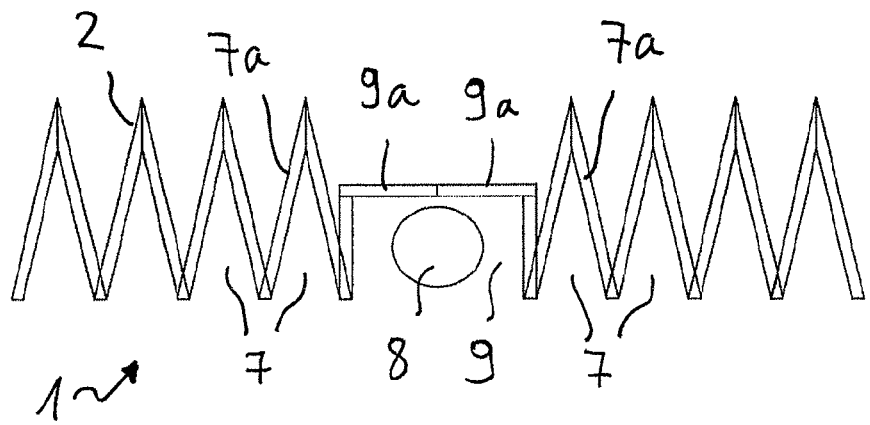
FIG. 5 is a section view of an additional filter element in which the flanking fold walls form a rectangular fold cross-sectional surface.

FIG. 5 shows an additional embodiment example of a filter element 1. In this filter element 1, the flanking fold walls 9a form a rectangular fold cross-sectional surface 9.

Figure 6:
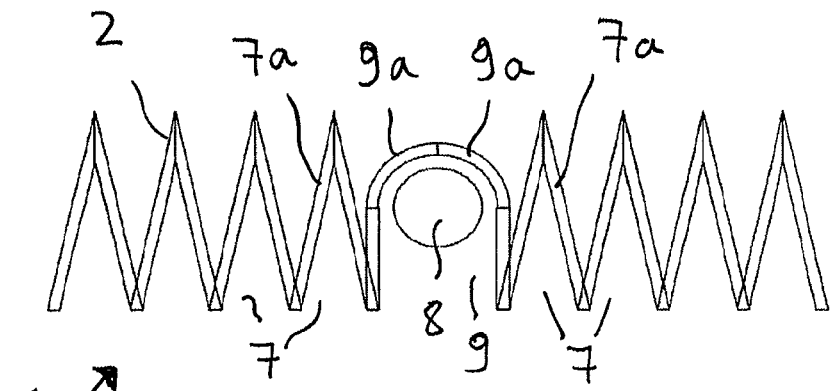
FIG. 6 is an additional embodiment example of a filter element in which two flanking fold walls are arch-shaped.

FIG. 6 shows an additional embodiment example of a filter element 1. With this filter element 1, the flanking fold walls 9a form a kind of gatelike arch, within which the guiding slot 8 is placed.

Figure 7:
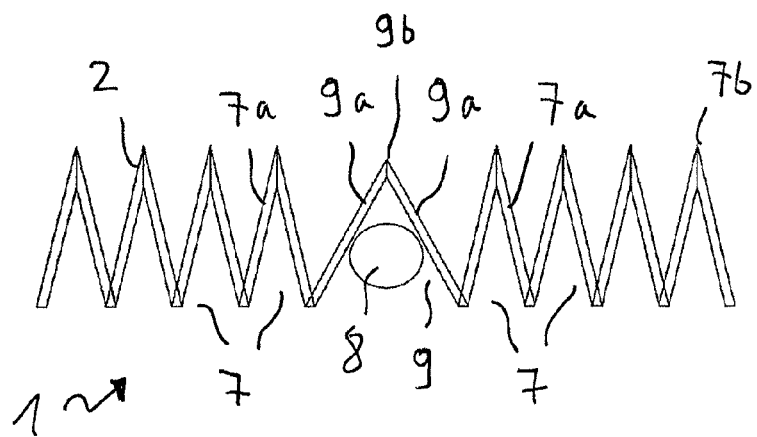
FIG. 7 is an embodiment example of a filter element in which two flanking fold walls are inclined at a larger angle to each other than the regular fold walls.

FIG. 7 shows another embodiment example of a filter element 1, in which the flanking fold walls 9a are inclined toward each other at a larger angle than the regular fold walls 7a. In this embodiment, fold tip 9b, at which the flanking fold walls 9a converge, is placed lower than fold tips 7b of the regular fold walls 7a.

Figure 8:
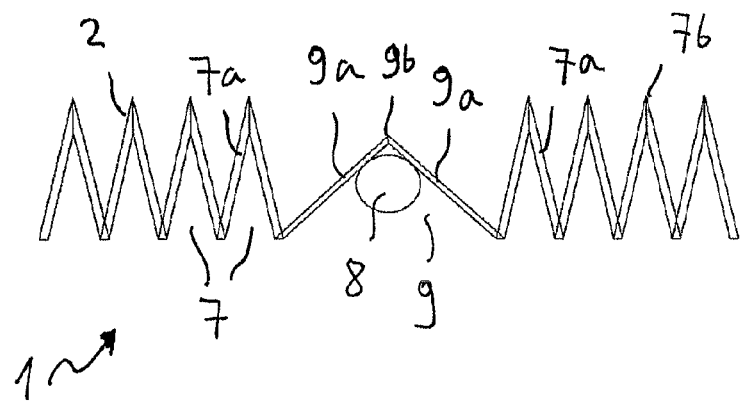
FIG. 8 is an additional embodiment example of a filter element in which the flanking fold walls are inclined at a larger angle to each other than the regular fold walls.

FIG. 8 shows an additional embodiment example of a filter element 1 with geometric relationships similar to those depicted in FIG. 7. In FIG. 8, the flanking fold walls 9a are inclined to each other at a considerably larger angle than the regular fold walls 7a.

Figure 9:
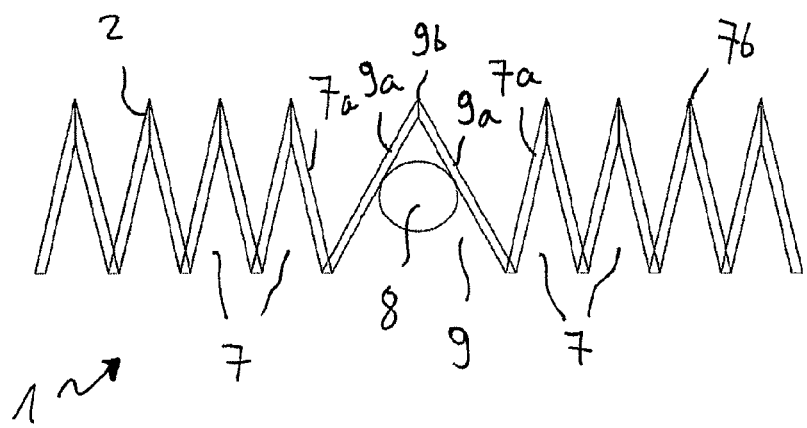
FIG. 9 is an additional embodiment example of a filter element in which the flanking fold walls are inclined at a larger angle to each other than the regular fold walls, wherein the flanking fold walls have a larger fold-wall height than the regular fold walls.

FIG. 9 shows an additional embodiment example of a filter element 1 in which flanking fold walls 9a are inclined to each other at a larger angle than the regular fold walls 7a.

Moreover, the flanking fold walls 9a have a greater fold wall height than the regular fold walls 7a. It is due to this that the fold tips 7b of the regular fold walls 7a and the fold tips 9b of the flanking fold walls 9a are at the same height.

All of the filter elements 1 described previously have one or more edge strips 4, in which or into which passages 5 are formed for guide pins.

FIGS. 2 to 9 show that the guiding slot 8 lies completely within the fold cross-sectional surface 9 having a different geometry. However, it is also conceivable to place the guiding slot 8 into the fold cross-sectional surface 9 with a different geometry, especially predominantly, so that the design heights of filter elements 1 remain small.

Figure 10:
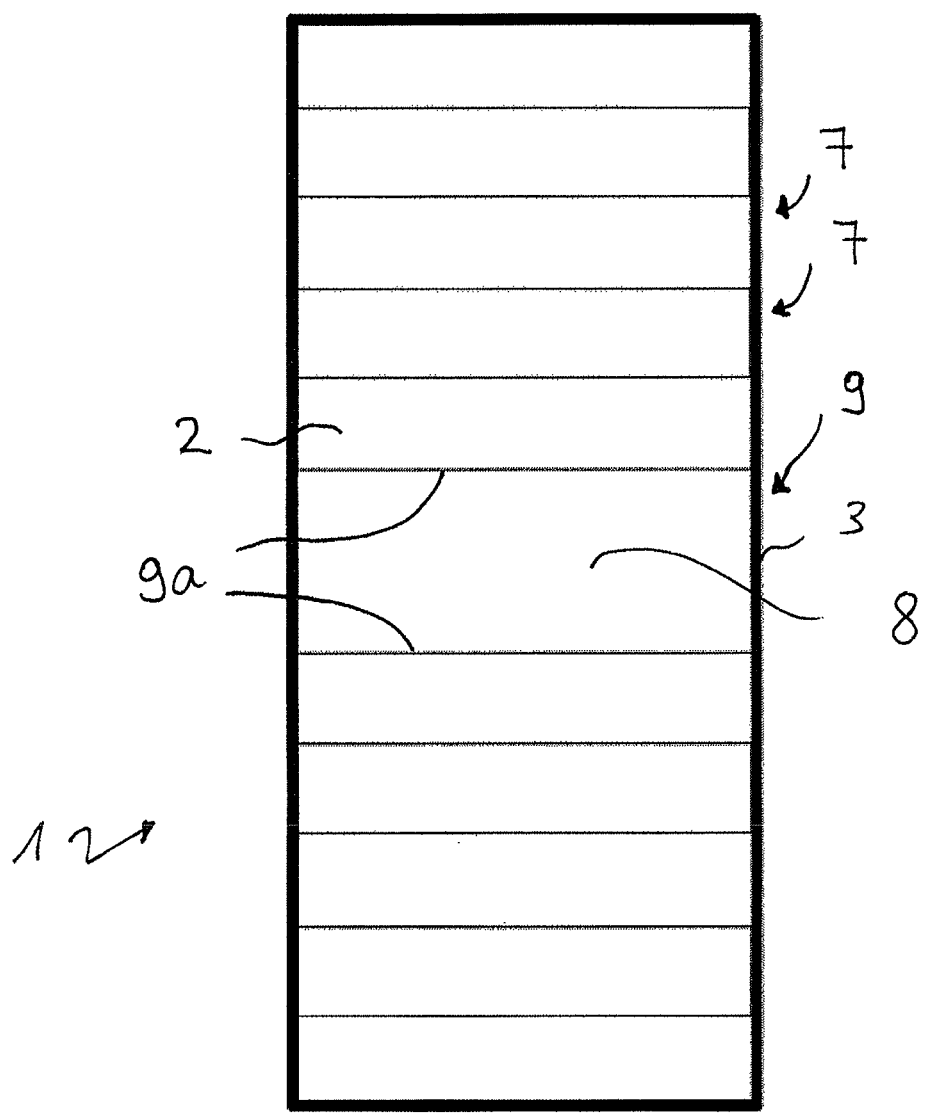
FIG. 10 is an additional embodiment example of a filter element in which the flanking fold walls are spaced from each other by fanning of the bellows, wherein the fold backs of the flanking fold walls are oriented parallel to each other in the area of the guiding slot.
Figure 11:
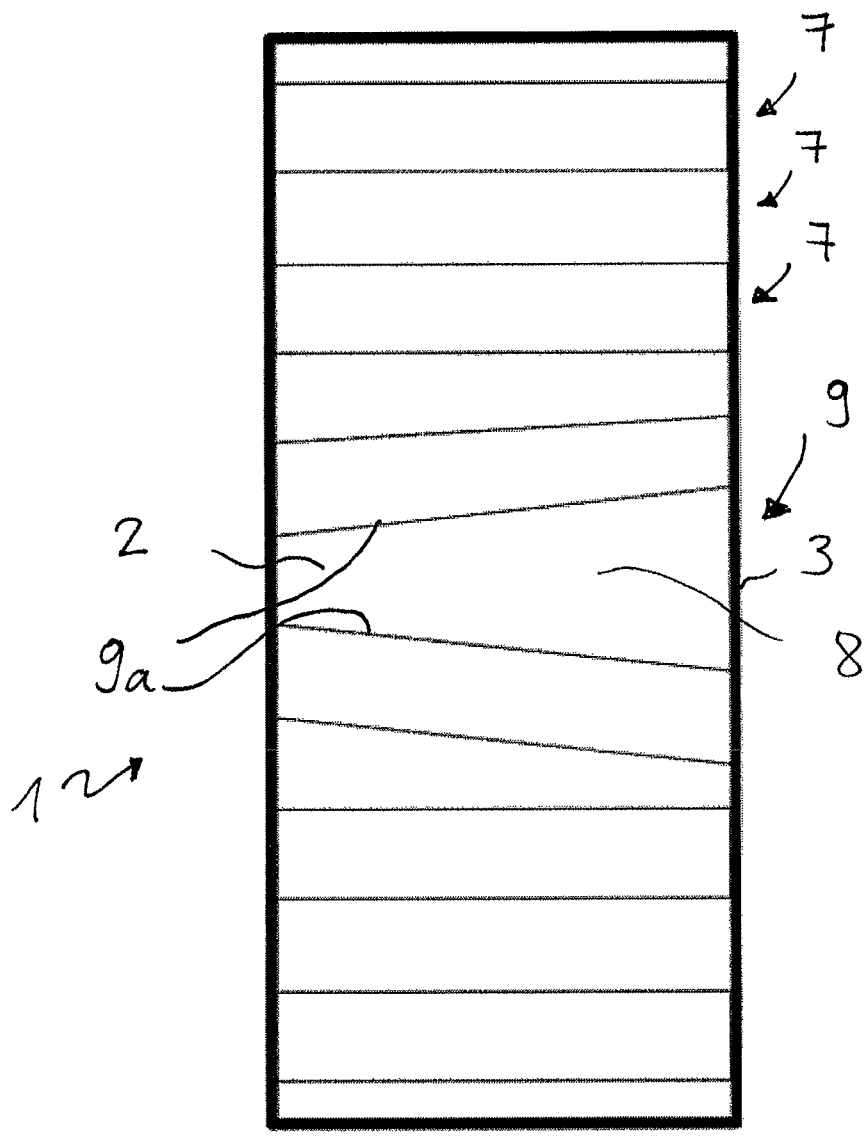
FIG. 11 is an additional embodiment example of a filter element in which the flanking fold walls are spaced from each other by fanning of the bellows, wherein the fold backs of the flanking fold walls are oriented at a slant to each other in the area of the guiding slot.
Figure 12:
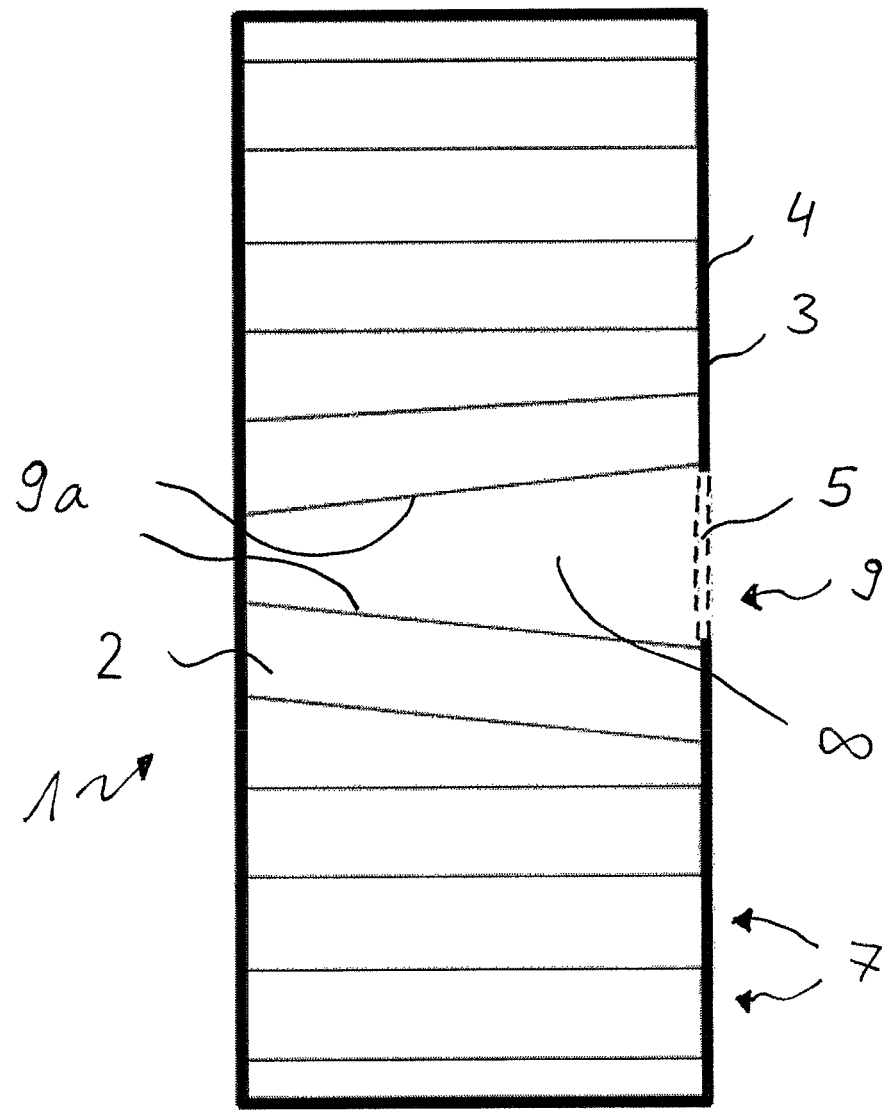
FIG. 12 is an additional embodiment example of a filter element in which the flanking fold walls are spaced from each other by fanning of the bellows, wherein the fold backs of the flanking fold walls are oriented at a slant to each other in the area of the guiding slot, and wherein a passage is inserted in the edge strip.

FIGS. 10 to 12 show further embodiment examples of filter elements 1, in which the geometry of the fold cross-sectional surface 9 in the area of a guiding slot 8 is set by a fanning of bellows 2. FIG. 12 depicts that a front side 3 is hemmed by an edge strip 4, into which a passage 5 is made for guide pins.

Filter elements 1 comprise bellows made of fleece materials. Preferably, filter elements 1 are configured as combination filters with a particle filter layer and an adsorbent layer.

What is claimed is:

1. A filter element for insertion into a housing of a ventilation unit or air conditioner, comprising:
    a bellows with folds and a front side, wherein the front side can face a wall of the housing and at least one guiding slot is assigned to the front side,
    wherein the folds include a multiplicity of regular fold walls and two flanking fold walls, and the two flanking fold walls flank the guiding slot,
    wherein the folds at the front side define fold cross-sectional surfaces, and the fold cross-sectional surface of the flanking fold walls has a geometry that is different from the fold cross-sectional surface of the multiplicity of regular folds, and
    wherein the guiding slot lies predominantly or entirely within the fold cross-sectional surface of the two flanking walls.

2. The filter element according to claim 1, wherein the flanking fold walls are deformed.

3. The filter element according to claim 1, wherein at least one support element is assigned to the fold cross-sectional surface in the area of a guiding slot.

4. The filter element according to claim 1, wherein the flanking fold walls have two sections that are angled toward each other.

5. The filter element according to claim 1, wherein the flanking fold walls are arch-shaped.

6. The filter element according to claim 1, wherein the flanking fold walls form a rectangular fold cross-sectional surface.

7. The filter element according to claim 1, wherein the flanking fold walls are inclined toward each other at a greater angle than the regular fold walls.

8. The filter element according to claim 1, wherein the flanking fold walls have a larger fold wall height than the regular fold walls.

9. The filter element according to claim 1, wherein the geometry of the fold cross-sectional surface is set in the area of a guiding slot by a fanning of the bellows.

* * * * *